United States Patent Office 3,194,789
Patented July 13, 1965

3,194,789
POLYMERIZATION OF FORMALDEHYDE
Hiroo Oba, Nishinomiya, Masataka Nakahara, Takatsuki, Hisao Naito, Sakai, and Yoshihiro Osada, Mishimacho, Mishimagun, Japan, assignors to Kanegafuchi Spinning Co., Ltd., Tokyo, Japan
No Drawing. Filed Jan. 29, 1962, Ser. No. 169,618
Claims priority, application Japan, Feb. 6, 1961, 36/4,289; Feb. 15, 1961, 36/5,173; Mar. 31, 1961, 36/11,552
4 Claims. (Cl. 260—67)

This invention relates to the preparation of formaldehyde polymers by processes wherein substantially anhydrous formaldehyde vapors are directly contacted with a specific solid metal salt which is used as a polymerization unitiator or catalyst.

Since the polymerization of formaldehyde was reported by H. Staudinger in "Die Hochmolekularen Organischen Verbindungen," Julius Springer, Berlin, 1932, there has been made and reported a number of studies of the polymerization of formaldehyde, and there has also been issued of published a number of patents relating to the preparation of high molecular weight polyoxymethylenes or formaldehyde polymers.

Most of these known methods for polymerizing formaldehyde are the so-called "solution" polymerization processes, a typical one being seen in U.S. Patent No. 2,768,994 of October 30, 1956, in which is described a method wherein purified and anhydrous formaldehyde vapors are introduced in a liquid medium containing a catalytic amount of an initiator to allow the formaldehyde to polymerize to a high molecular weight polymer.

These "solution" polymerization methods, however, have various drawbacks. For example, it is required to employ expensive organic reaction mediums such as hydrocarbons. Furthermore, troublesome operations are necessary to separate the produced polymer from the reaction medium and to recover the medium for further use. The polymer should be washed to remove the organic reaction medium and dried.

A heterogeneous reaction wherein anhydrous formaldehyde vapors are directly contacted with the surface of a specific solid catalyst has been proposed in German Patent No. 1,104,179 in which is described a method wherein substantially anhydrous, monomeric, gaseous formaldehyde is contacted with the surface of a catalyst in the form of a plate or the like containing essentially aluminium, aluminium oxide or aluminium oxide hydrate to allow the formaldehyde to polymerize on said surface. According to this process the formed polymer accumulates on the catalyst plate so that it must be removed from the catalyst plate surface from time to time. Apparently, this process can not be carried out continuously. Among other drawbacks of this method is in the fact that as the formed polymer accumulates on the catalyst plate the activity of the catalyst is reduced and the rate of polymerization is remarkably decreased within a relatively short perod of time. Furthermore, since the catalyst is in the form of plate the effective surface per unit amount of the catalyst is rather small.

It is an object of this invention to provide a novel method for preparing high molecular weight polyoxymethylenes of formaldehyde polymers without using any liquid medium.

It is another object of this invention to provide a novel method for preparing such polymers continuously without using any liquid medium and in a heterogeneous reaction system.

It is still another object of this invention to provide a novel method for preparing such polymers in an excellent yield and continuously without using any liquid medium and with a gas-solid catalyst heterogeneous reaction system.

It is still another object of this invention to provide a novel method of the type described above, with high polymerization velocity which will not be decreased noticeably as the reaction proceeds.

Still another object of this invention is to provide a novel catalyst useful in the mentioned method.

Other objects, advantages and features of this invention will be apparent from the following detailed explanation.

The above objects are accomplished by contacting substantially anhydrous, gaseous, monomeric formaldehyde directly with at least one solid catalyst in a finely divided state selected from the group consisting of salts of oxyacids with the elements belonging to Group II of the Periodic Table and with lead, manganese, nickel, cobalt and cerium, without using any liquid medium.

We have found that the salts of oxyacids with the elements belonging to Group II, Periodic Table and lead, manganese, nickel, cobalt and cerium are remarkably active as initiators or catalysts in the polymerization of gaseous, anhydrous formaldehyde to produce high molecular weight polyoxymethylenes.

Oxyacids for forming the salts or catalysts of this invention may be those of sulphur (Group VI), phosphorus and antimony (Group V), carbon, silicon, titanium, germanium and tin (Group IV), and boron (Group III). Examples of the salts of these oxyacids and the elements belonging to Group II, Periodic Table and lead, manganese, nickel, cobalt and cerium which are useful as initiators according to this invention are as follows:

Group III—$MgB_4O_7$, $ZnB_4O_7$, $CdB_4O_7$, $Pb(BO_2)_4$, $MgB_4O_7$, $CoH_4(BO_3)_2$, $MnB_4O_7$, $CaB_4O_7$, $SrB_4O_7$, $BaB_4O_7$, $AlB_4O_7$ Group IV—$PbCO_3$, $BaCO_3$, $MnCO_3$, $CoCO_3$, $CaCO_3$, $CdCO_3$, $MgCO_3$, $ZnCO_3$, $NiCO_3$, $CuCO_3$ Group IV—$CaSiO_3$, $MgSiO_3$, $ZnSiO_3$, $SrSiO_3$, $CdSiO_3$, $BaSiO_3$, $PbSiO_4$, $Co_2SiO_4$, $Ni_2SiO_4$, $Mg_2SiO_4$ Group IV—$CaTiO_3$, $BaTiO_3$, $CaSnO_3$, $MgSnO_3$ Group IV—$Mg_2GeO_4$, $ZnGeO_4$, $Ni_2GeO_4$, $Ba_2GeO_4$ Group V—$Zn_3(PO_4)_2$, $Zn_2P_2O_7$, $Ca_3(PO_4)_2$, $Ca(PO_3)_2$, $CaHPO_4$, $Ca(H_2PO_4)_2$, $BaHPO_4$, $MgHPO_4$, $CePO_4$, $Pb_3(PO_4)_2$, $Ba_3(PO_4)_2$, $Mg_2P_2O_7$, $AlPO_4$ Group V—$Pb_2Sb_2O_7$, $Ca_2Sb_2O_7$, $MgSb_2O_6$, $CoSb_2O_6$, $NiSb_2O_6$, $Sr_2Sb_2O_7$, $Cd_2Sb_2O_7$, $ZnSb_2O_4$, $MnSb_2O_4$ Group VI—$ZnSO_4$, $CdSO_4$, $CaSO_4$, $CoSO_4$, $HgSO_4$, $Ce_2(SO_4)_3$, $Ce(SO_4)_2$, $PbSO_4$, $Pb(SO_4)_2$, $NiSO_4$, $BaSO_4$, $MgSO_4$ Among those mentioned, boric acid salts, more particularly $CdB_4O_7$, $BaB_4O_7$, $AlB_4O_7$ and $Pb(BO_2)_4$; carbonates, more particularly $CaCO_3$, $BaCO_3$, $CuCO_3$, $MnCO_3$ and $CoCO_3$; and phosphates, more particularly $Ca_3(PO_4)_2$ and $AlPO_4$ are preferred, because they are more catalytically active than others so that more polymer can be produced per unit amount of the catalyst. Furthermore, when these preferred catalysts are employed the polymers obtained are higher in molecular weight and thermally stable. Moreover, these preferred catalysts do not adversely affect the properties of the polymers containing the same. These preferred catalysts are thermally stable and can be easily obtained in anhydrous state.

These catalysts or initiators are used preferably in the form of powder or in a finely divided state in order to increase the effective surface to be contacted with gaseous formaldehyde. The powder form is preferred because of larger effective surface per unit amount.

The gaseous formaldehyde monomer to be employed may be prepared from any source. Thus, for example, gaseous formaldehyde monomer prepared by the pyrolysis of hemiformals as described in U.S. Patent No. 2,848,-500 can be used. Other sources such as paraformaldehyde can also be used. In any event, it is preferably that the gaseous formaldehyde monomer be substantially anhydrous. The words "substantially anhydrous" as herein used are intended to mean that the water content in the monomer is less than 0.5% by weight. Removal of water from the gaseous formaldehyde monomer may be carried out by any known manner, such as by passing formaldehyde gas through cold trap(s) as described in the above mentioned U.S. Patent No. 2,848,500. Alternatively, metal hydride powder may be mixed, as a dryer, with gaseous formaldehyde monomer. Examples of such metal hydrides are calcium hydride ($CaH_2$), cobalt hydride ($CoH_2$), cerium hydride (CeH), nickel hydride ($NiH_2$), strontium hydride ($SrH_2$) and barium hydride ($BaH_2$). These metal hydrides quickly react with water contained in gaseous formaldehyde monomer to render the latter substantially anhydrous. The amount of the metal hydride to be added is not critical, but it is preferable that it be added in an amount at least chemically equivalent to the amount of water contained in the formaldehyde. For example, calcium hydride ($CaH_2$) can react with approximately chemically equivalent amount of water and can quickly remove even a trace of moisture in the formaldehyde vapor. The gaseous formaldehyde monomer can be charged into a reaction zone as admixed with such metal hydride.

There are some catalysts (such as calcium carbonate, calcium phosphate, etc.) which tend to produce polymers having too high molecular weight to be molded or fabricated. This tendency can be avoided when a monomer of higher water content (but within the range mentioned before or less than 0.5% by weight of water based on the monomer) is employed. Thus, for example, monomeric formaldehyde gas may be used without passing through cold traps.

Any reaction vessel which permits intimate contact of the monomeric formaldehyde gas with a catalyst powder may be employed, but it is necessary to provide the vessel with a cooling device in order to take off the heat produced by the exothermic polymerization reaction. Preferably the polymerization is conducted continuously. For this purpose, for example, a couple of kneader (each fitted with a stirrer) arranged in parallel and provided with cooling means such as cooling jacket may be employed. By alternately operating the two, the polymerization can be carried out continuously. Alternatively, a horizontally arranged cylindrical vessel internally provided with a screw shaft extending longitudinally of the vessel may be used. Here also an external cooling means such as a cooling jacket is provided and, in addition, it is preferable to make the said screw shaft hollow so as to allow the flow or circulation of a cooling medium through the shaft. The monomeric gas along with a catalyst is continuously charged to the vessel from one end thereof, continuously conveyed by the screw shaft conveyor through the vessel and continuously discharged from the other end. In any case, it is most important that the cooling capacity for the apparatus should be sufficient to substantially take out the heat produced by the exothermic reaction and to avoid local high temperature, because if the temperature is unduly increased the polymerization velocity is decreased, and local overheating will result in the formation of massive or filmy polymer instead of desired powder form.

The substantially anhydrous, gaseous, monomeric formaldehyde is introduced, if desired continuously, into the reaction vessel along with a predetermined amount of the initiator or catalyst. Alternatively, the monomeric gas is introduced into the reactor in which has been placed a catalyst.

It is preferably that the salts of oxyacids to be employed as catalysts or initiators in this invention are in the anhydrous state. However, if it is impossible to prepare anhydrous salts for any reason such as decomposition they are used preferably with their minimum water of crystallization. Such a small amount of water of crystallization accompanying a catalyst does not adversely affect the reaction.

When the reaction is violent it may be controlled by diluting the gaseous formaldehyde monomer with a suitable amount of an inert gas such as hydrogen, nitrogen, etc. When such inert gas is employed the polymerization velocity is controlled and the polymerization heat is carried away thereby, but on the other hand the reaction velocity is lowered (this being remarkable when $CO_2$ gas is used) due to decrease in concentration of formaldehyde in the reaction mixture and furthermore there would be a trouble in recovering unreacted monomeric formaldehyde discharged from the reaction vessel together with the inert gas. Therefore, in some instances, it may be desirable not to employ such inert gas but to suitably select the kind of catalyst, polymerization temperature, cooling effect of the reaction vessel, etc., in order to satisfactorily proceed the polymerization.

The amount of the initiator with respect to formaldehyde is not critical and varies over a wide range depending upon the particular catalyst or its catalytic activity, polymerization conditions, etc. Generally, the use of initiator in an amount of about 0.00001% to about 50% by weight based on formaldehyde gives a satisfactory result, a higher concentration than about 50% will not give any particular advantage.

The temperature of the reaction may vary from about −20° C. to about 100° C. The preferred temperature range is below 70° C., more particularly from about 10° C. to 40° C.

The catalysts of this invention are remarkably active and the polymerization can be continued until the activity of the catalyst is lost. Generally, the catalytic activity is not decreased even after a polymer 1000 or more times the amount (on weight basis) of the catalyst has been produced.

Since the catalyst of this invention is remarkably active and its effective surface is large, the gaseous formaldehyde monomer, when contacted with the catalyst, is allowed to polymerize with a high velocity to a high molecular weight polymer in an excellent yield nearly up to about 100%. The polymer is in the form of white powder and generally its molecular weight is from about 30,000 to about 60,000 (polymerization degree; from about 1000 to about 2000). The polymerization degree is fairly uniform and molecular weight distribution of the resulting polymeric product is sharp. The product contains little low molecular weight polymers. This is evidenced by the fact that the polymeric product of this invention has a value of the reaction rate constant for thermal degradation at 222° C. ($k_{222}$) below 5.0.

Apparently, the polymeric product discharged from the reaction vessel will contain the initiator employed. However, most of the initiators of this invention do not adversely affect the physical and chemical properties of the polymers. Some initiators may increase the thermal stability of the polymers. When an initiator-free pure polymer is desired the polymer may be washed with a solvent for the particular initiator employed and contained in the polymer. In this case, it is preferable to employ a water soluble initiator and wash the polymeric product with water to remove the initiator contained in the polymer.

The polymers produced by the process of this invention are useful in shaping or molding various articles such as films, fibres and other shaped articles.

The following examples are given by way of illustration. In these examples, all parts are by weight and inherent viscosities were measured at 60° C. in a 0.5% solution of each polymer in p-chlorophenol containing 2% by weight of alpha-pinene. The value of the reaction rate constant for thermal degradation at 222° C. ($k_{222}$)

was determined by the procedure as described in U.S. Patent No. 2,768,994.

EXAMPLE 1

Highly purified gaseous formaldehyde monomer was prepared by pyrolyzing hemiformal of cyclohexanol. The gaseous mixture of monomeric formaldehyde, cyclohexanol and a small amount of purities obtained by the pyrolysis of hemiformal was passed through a condenser to remove the cyclohexanol, and then passed through a series of three traps held at $-15°$ C. The purified, monomeric, formaldehyde gas was introduced into a polymerization apparatus which consisted of two reactors (each in the form of a kneader fitted with a stirrer) arranged in parallel so that they are operated alternately to continuously carry out the polymerization. In each of the reactors were placed 10 parts of anhydrous $BaCO_3$ powder and the stirrer was operated at about 100 r.p.m. while maintaining the interior temperature at $0°$ C. To this reactor was charged the gaseous, purified, monomeric formaldehyde at a rate of 200 parts per minute. Upon commencement of the reaction the interior temperature of the reactor was held at $15°$ C. by external cooling. The polymerization reaction was continued for one hour at that temperature ($15°$ C.). At the end of this time there were obtained 8640 parts of white formaldehyde polymer powder having an inherent viscosity of 1.60 and a reaction rate constant for thermal degradation at $222°$ C. ($k_{222}$) of 5.2.

EXAMPLE 2

The procedures of Example 1 were repeated except that various anhydrous oxyacid salts other than anhydrous $BaCO_3$ were employed as the initiators. The results are given in Table I. In each case the polymeric formaldehyde product was in the form of white powder.

Table I

| Polymerization initiator | Amount of polymer recovered (parts) | Inherent viscosity $[\mu]$ | Reaction rate constant for thermal degradation at $222°$ C. ($k_{222}$) |
|---|---|---|---|
| $CdB_4O_7$ | 4,860 | 1.20 | 6.0 |
| $BaB_4O_7$ | 4,200 | 1.10 | 7.2 |
| $Pb(BO_2)_4$ | 6,720 | 0.90 | 9.7 |
| $CaCO_3$ | 12,000 | 2.62 | 3.7 |
| $CoCO_3$ | 9,660 | 1.45 | 6.2 |
| $NiCO_3$ | 3,360 | 0.76 | 8.4 |
| $Zn_3(PO_4)_2$ | 3,600 | 1.20 | 7.0 |
| $MgHPO_4$ | 2,400 | 0.98 | 6.5 |
| $CaSO_4$ | 2,160 | 1.01 | 10.2 |

EXAMPLE 3

The procedure of Example 1 was repeated except that anhydrous $Ca_3(PO_4)_2$ powder was employed instead of anhydrous $BaCO_3$ powder and that the rate of introduction of the purified monomeric formaldehyde gas was 105 parts per minute. There were obtained 6000 parts of white formaldehyde polymer powder having an inherent viscosity of 2.05 and a reaction rate constant for thermal degradation at $222°$ C. ($k_{222}$) of 3.8.

The same procedure was repeated except that the monomeric formaldehyde gas was diluted with an inert gas in order to facilitate the reaction control. Thus, mixed 75 parts of the formaldehyde gas and 35 parts of dry hydrogen gas, per minute, were introduced into the reactor. There were obtained 3500 parts of white polymeric formaldehyde powder having an inherent viscosity of 1.60 and a reaction rate constant for thermal degradation at $222°$ C. ($k_{222}$) of 4.0. The yield was reduced to 83.5% but the polymeric product was more moldable or fabricable than that obtained first in this example.

EXAMPLE 4

In this example a continuous flow type reactor was employed. The reactor was constructed by a horizontally arranged cylindrical body with their both ends closed. The cylindrical body was provided with an external cooling jacket and with a screw conveyor shaft extending longitudinally of and within the cylinder. The said shaft was made hollow to circulate a cooling medium therethrough. Inlets for gas and initiator were provided on the wall of the cylinder adjacent one end thereof and an outlet of the product was provided on the wall of the cylinder adjacent the other end thereof. The length of the cylinder and the rate of conveyance of the reactant in the cylinder by the screw shaft were so selected that during the passage through the cylindrical reactor the reactant completes the desired polymerization.

While rotating the screw conveyor shaft a monomeric formaldehyde gas from the pyrolysis of commercial paraformaldehyde, without subsequent dehydration, was introduced into the reactor continuously in an amount of 200 parts per minute. Along therewith, cobalt acetate and calcium hydride, each one part per minute, were introduced into the reactor. Cooling medium was circulated through the cooling jacket and the hollow shaft to hold the interior temperature of the reactor at $10°$ C. The residence time was 20 minutes. In this way, 200 parts (per minute) of white polymeric formaldehyde powder were continuously produced. The polymer had an inherent viscosity of 1.52 and a reaction rate constant for thermal degradation at $222°$ C. ($k_{222}$) of 4.0.

For comparison, the same procedure was repeated except that the calcium hydride was not charged. In this case there were obtained, per minute, 160 parts of low molecular weight polymer having an inherent viscosity of 0.72 and a reaction rate constant for thermal degradation at $222°$ C. ($k_{222}$) of 10.6.

EXAMPLE 5

In this example the monomeric formaldehyde was prepared by pyrolyzing commercial paraformaldehyde. The formaldehyde vapors from the pyrolysis of paraformaldehyde were then passed through a series of cold traps to render the same substantially anhydrous. The anhydrous, gaseous, monomeric formaldehyde was continuously introduced into the reactor of Example 4 in an amount of 150 parts per minute along with one part (per minute) of anhydrous $PbSO_4$ powder. The polymerization was continued at $10°$ C. with a residence time of 20 minutes, and there were continuously obtained, per minute, 120 parts of white polymeric formaldehyde powder. The polymer was 0.86 in the inherent viscosity and 7.2 in the reaction rate constant for thermal degradation at $222°$ C. ($k_{222}$).

EXAMPLE 6

The procedure of Example 5 was repeated except that the anhydrous monomeric formaldehyde gas was introduced into the reactor in an amount of 160 parts per minute and anhydrous $CaCO_3$ powder was employed as the initiator instead of $PbSO_4$ powder. There were continuously obtained 160 parts (per minute) of white polymeric formaldehyde powder having an inherent viscosity of 2.6 and a reaction rate constant for thermal degradation at $222°$ C. ($k_{222}$) of 3.7.

The above procedure was repeated except that the gaseous monomeric formaldehyde prepared from the pyrolysis of paraformaldehyde was, without the subsequent dehydration, directly introduced in the reactor. The polymer obtained was 1.1 in the inherent viscosity and 6.4 in the reaction rate constant for thermal degradation at $222°$ C. ($k_{333}$).

What we claim is:
1. A process for preparing a high molecular weight formaldehyde polymer which comprises contacting gaseous monomeric formaldehyde, in the absence of any liquid medium, with a solid catalyst selected from the group consisting of salts of oxyacids of boron, carbon, phosphorus and sulfur with an element selected from the group consisting of those belonging to Group II of the Periodic Table, lead, manganese, nickel, and cobalt, and recovering the high molecular weight formaldehyde polymer produced.

2. The process of claim 1 in which the catalyst is employed in an amount of from 0.00001% to 50% by weight based on the monomeric formaldehyde.

3. The process of claim 1 in which the polymerization is carried out at a temperature between −20° C. and 100° C.

4. The process of claim 1 in which the catalyst is employed in the form of powder.

References Cited by the Examiner

UNITED STATES PATENTS

| | | | |
|---|---|---|---|
| 2,519,550 | 8/50 | Craven | 260—67 |
| 2,848,437 | 8/58 | Langsdorf et al. | 260—67 |
| 2,964,500 | 12/60 | Jenkins et al. | 260—67 |
| 3,005,799 | 10/61 | Wagner | 260—67 |

FOREIGN PATENTS

| | | |
|---|---|---|
| 1,211,002 | 10/59 | France. |
| 1,300,492 | 6/62 | France. |

WILLIAM H. SHORT, *Primary Examiner.*

LOUISE P. QUAST, *Examiner.*